United States Patent [19]  [11] 3,952,490
Brockman  [45] Apr. 27, 1976

[54] LAWN RAKE
[76] Inventor: Furn O. Brockman, 3843 61st St., Kansas City, Mo. 64130
[22] Filed: Nov. 15, 1974
[21] Appl. No.: 524,366

[52] U.S. Cl. .......................... 56/400.14; 56/400.19
[51] Int. Cl.² ........................................... A01D 7/00
[58] Field of Search ....... 56/400.09, 400.14, 400.01, 56/400.19

[56] References Cited
UNITED STATES PATENTS

| | | | |
|---|---|---|---|
| 687,185 | 11/1901 | Allen | 56/339 |
| 1,728,331 | 9/1929 | Christianson | 56/400.13 |
| 2,268,250 | 12/1941 | Gormley et al. | 56/400.14 |
| 2,647,356 | 8/1953 | Adams | 56/400.14 |

Primary Examiner—Russell R. Kinsey
Attorney, Agent, or Firm—John A. Hamilton

[57] ABSTRACT

A lawn rake consisting of an elongated frame bar carried for vertical tilting movement on a transverse axis by a pair of ground-engaging wheels, and having a handle at one end thereof and tines at its opposite end adapted to be moved into or out of engagement with the ground by tilting of the frame, and mechanism operable to adjust the elevation of the handle above the ground, the vertical movement of the handle required to produce the desired vertical movement of the tines, and the mechanical force with which the tines engage the ground.

2 Claims, 5 Drawing Figures

U.S. Patent  April 27, 1976  3,952,490
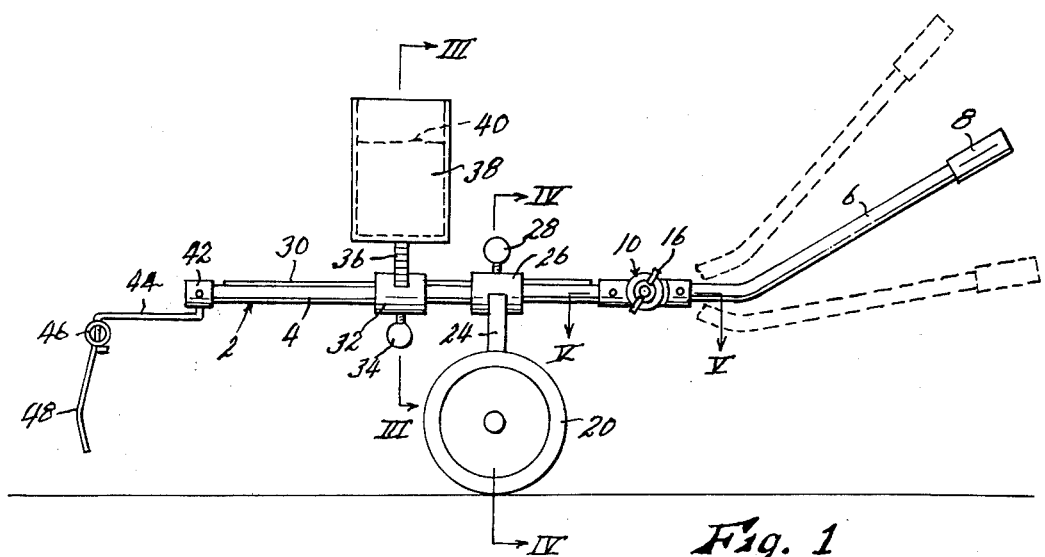
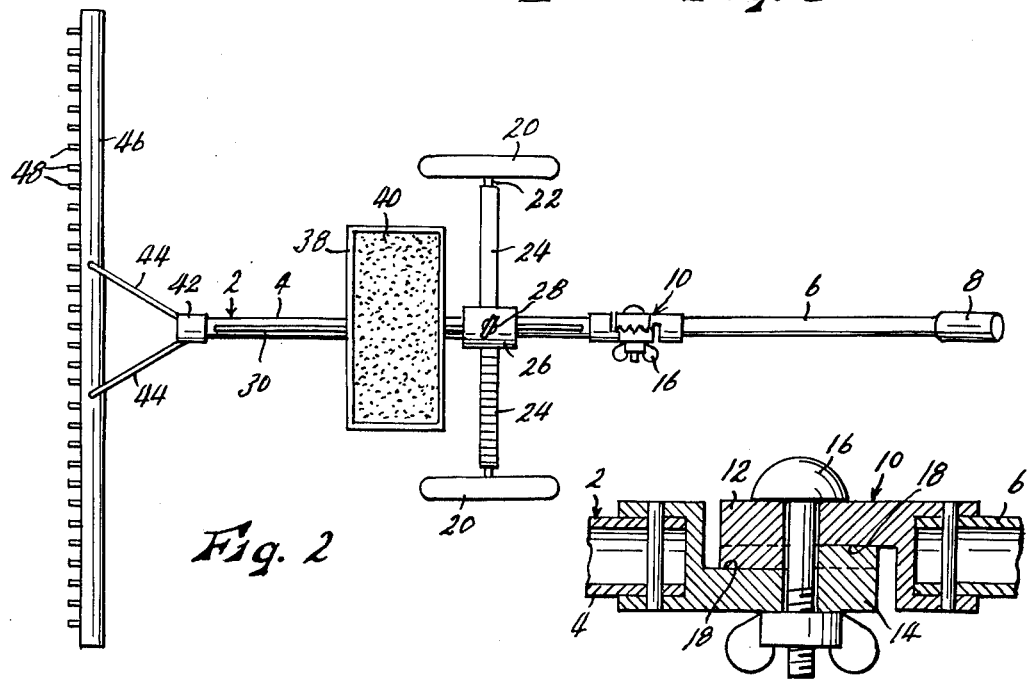
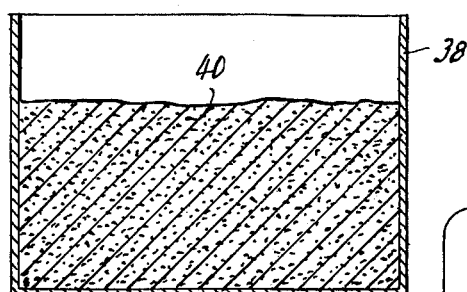
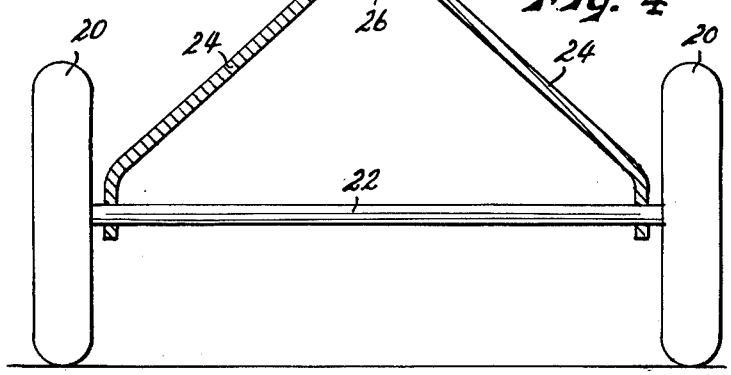

LAWN RAKE

This invention relates to new and useful improvements in lawn rakes, and has as its principal object the provision of a manually operable rake which need not be supported by the operator in its back and forth movement over the ground, but is supported by ground-engaging wheels. It is thus particularly suited for use by the elderly or infirm, although it will substantially reduce the physical effort required from any user. Generally, this object is accomplished by supporting the elongated frame or handle of the rake by a pair of ground-engaging wheels carried thereby on a horizontal axis intermediate its ends. Thus the tines at one end of the frame can be raised above or lowered into contact with the ground by vertical manipulation of a hand grip at the opposite end of the frame, said hand grip also being utilized to push and pull the rake in its back and forth movement over the ground.

Another object is the provision of a lawn rake of the character described in which the elevation of the hand grip above the ground is adjustable to the preference of each individual user.

A further object is the provision of a lawn rake of the character described in which the vertical movement of the hand grip necessary to produce a given vertical movement of the tines can be adjusted to the preference of each individual user.

A still further object is the provision of a lawn rake of the character described including a weight operable to press the rake tines against the ground, and means for adjusting the effective mass of said weight to different types of raking operations.

Still another object is the provision of a lawn rake of the character described wherein the rake bar carrying the tines is yieldably mounted relative to the frame, whereby to insure efficient contact of the tines with the ground despite irregularities of the ground surface.

Other objects are simplicity and economy of construction, and efficiency and dependability of operation.

With these objects in view, as well as other objects which will appear in the course of the specification, reference will be had to the accompanying drawing, wherein:

FIG. 1 is a side elevational view of a lawn rake embodying the present invention, with alternative positions of the handle being indicated in dotted lines, FIG. 2 is a top plan view of the rake as shown in FIG. 1, FIG. 3 is an enlarged sectional view taken on line III—III of FIG. 1, FIG. 4 is an enlarged sectional view taken on line IV—IV of FIG. 1, and FIG. 5 is an enlarged fragmentary sectional view taken on Line IV—IV of FIG. 1.

Like reference numerals apply to similar parts throughout the several views, and the numeral 2 applies generally to the frame of the rake, constituting generally an elongated bar, which may be of round tubular stock, having a front section 4 and a rear section 6. Front section 4 normally extends generally horizontally parallel to the direction of travel of the rake in use, and rear section 6 is angled upwardly to the rear to form a handle having a hand grip 8 at its rearward end. Sections 4 and 6 are joined by a "rosette" connector 10 which, as best shown in FIG. 5, consists of a pair of discs 12 and 14 secured coaxially together by a bolt 16 extending transversely, and having their mating surfaces radially grooved as indicated at 18. Said grooves normally maintain frame sections 4 and 6 in a fixed angular relation, but when said bolt is loosened, the discs may be turned relatively about the bolt, whereby to adjust the elevation of hand grip 8 to the preferences of any individual user, as indicated in dotted lines in FIG. 1.

Frame 2 is supported movably by a pair of ground-engaging wheels 20 disposed on an axis transverse to and beneath frame section 4, and at respectively opposite sides of said frame. Said wheels are carried rotatably by an axle 22, which is supported from the frame by bracket arms 24 fixed at their upper ends to a sleeve 26 which is mounted on frame section 4 for longitudinal sliding movement therealong, but which may be fixed on the frame by a set screw 28. Said sleeve is provided with a keyway slidably engaged over a key member 30 fixed to and extending along frame section 4, so that the sleeve cannot rotate axially on the frame.

Forwardly of sleeve 26, a similar second sleeve 32 is mounted on frame section 4, being slidable therealong but being prevented from rotating thereon by key 30, and being fixable thereon by a set screw 34. Affixed to sleeve 32 is an upright bracket 36 to the upper end of which is affixed an open-topped container 38. Said container is adapted to be filled to any desired degree with sand 40 (as shown) or other suitable material such as bricks or stone to serve as a counter-weight, as will presently appear.

Affixed to the forwardmost end of frame section 4 is a fixture 42 to which are affixed the rearward ends of a pair of resilient spring arms 44. Said spring arms extend forwardly, in divergent relation, and both are affixed at their forward ends to a horizontal, transversely extending rake bar 46, said rake bar extending equally at both sides of the frame. A series of rake tines 48 are affixed in and project downwardly from said rake bar, preferably only to such a distance that their lower ends will be spaced above the ground when forward frame section 4 is horizontal. The spacing of the tines is a matter of design choice to be determined by the type of raking job for which the rake is intended. Also, said tines may be of any desired degree of rigidity or flexibility.

In use, the hand grip 8 is grasped by the operator to move the rake alternately forwardly and rearwardly over the ground, depressing the handle during the forward stroke to elevate tines 48 above the ground by tilting frame 2 about the axis of wheels 20, and elevating the handle during the rearward stroke to lower the tines into engagement with the ground. Thus the actual raking action occurs during the rearward strokes. Its operation is easy and efficient, requiring very little physical exertion, and it is thus well adapted for use by the elderly or infirm, or by those whose condition makes hard physical exercise inadvisable.

The various adjustments provided are of great importance. The connector 10 between the frame sections, as already discussed, permits elevation of hand grip 8 to the preference of each individual user. Adjustment of sleeve 26 forwardly or rearwardly along frame section 4, after loosening set screw 28, permits adjustment of the vertical distance hand grip 8 must be moved to provide a given vertical movement of tines 48. Forward adjustment of sleeve 26 increases the vertical movement of the hand grip required to produce a given vertical movement of the tines, while rearward adjustment of the slide produces an opposite effect. This adjustment would normally be made to suit the preferences of each user, and also according to the particular raking job being performed. Raking in deep grass, for example, normally requires the tines to be lifted higher during the forward strokes than is required when raking leaves or smoothing gravel or the like.

Forward or rearward adjustment of sleeve 32 on the frame adjusts the proportion of the weight carried by container 38 which must be supported by tines 48 when in engagement with the ground, and hence controls the force with which said tines are pressed against the ground, without exertion on the part of the user. Forward movement of the container increases the ground pressure of the tines, while rearward movement of the container reduces it. More radical adjustments of the tine pressure can of course be made by changing the quantity and mass of the heavy material 40 carried in the container. This adjustment is also made in view of the requirements of each specific raking operation. For example, raking leaves from short grass, or the smoothing of gravel surfaces, requires only a light tine pressure, while the removal of deep-seated "thatch" from a lawn requires very heavy tine pressure.

Finally, the spring arms 44 attaching rake bar 46 to frame 4 permits the rake bar to tilt laterally of the frame to accomodate the tines to the ground surface even when the line defined by the free lower ends of said tines is not parallel to the ground surface. This condition can of course occur when the ground surface is uneven or irregular, so that the line of the ground beneath the tines is not parallel to the line of the ground engaged by wheels 20. Thus an efficient raking action by the tines is assured despite the fact that the wheels may at any given instant be supporting the frame in a position not normally adapted to insure contact of all the tines with the ground. This "levelling" action of spring arms 44 is of course most efficient when container 38 is loaded and positioned to press the tines firmly against the ground. The tines, even if they are resilient, should be sufficiently stiff to remain in an effective attitude relative to the ground despite the maximum pressure which can be exerted thereon by the weight of container 38 and its contents.

While I have shown and described a specific embodiment of my invention, it will be readily apparent that many minor changes of structure and operation could be made without departing from the spirit of the invention.

What I claim as new and desire to protect by Letters Patent is:

1. A lawn rake comprising:
    a. an elongated longitudinally extending frame consisting of a substantially horizontal front bar section and an inclined rear bar section which constitutes a handle,
    b. a generally horizontal transverse rake bar at the forward end of said frame,
    c. means securing said rake bar to said frame,
    d. rake tines carried by said rake bar and projecting downwardly therefrom,
    e. ground-engaging wheels carried rotatably by said frame intermediate its ends and operable to support said frame above the ground, whereby upward and downward movement of the handle end of said frame will respectively lower said tines to the ground and raise them above the ground,
    f. a weight carried by said frame intermediate said wheels and said tines, whereby to bias said tines against the ground, said weight comprising an open-topped container mounted on said frame and adapted to contain material of any desired density and mass, and
    g. means operable to permit adjustable forward and rearward movement of said container relative to said frame.

2. A lawn rake comprising:
    a. an elongated longitudinally extending frame consisting of a substantially horizontal front bar section and an inclined rear bar section which constitutes a handle,
    b. a generally horizontal transverse rake bar at the forward end of said frame,
    c. means securing said rake bar to said frame, said securing means being resiliently yieldable to permit transverse lateral tilting of said rake bar relative to said frame,
    d. rake tines carried by said rake bar and projecting downwardly therefrom,
    e. a pair of ground-engaging wheels carried rotatably by said frame on a horizontal transverse axis and disposed at respectively opposite sides of said frame,
    f. means permitting forward and rearward adjustment of said wheels relative to said frame, and
    g. a weight carried by said frame intermediate said wheels and said tines, whereby to bias said tines against the ground.

* * * * *